US008606252B2

(12) United States Patent
Iqram

(10) Patent No.: US 8,606,252 B2
(45) Date of Patent: Dec. 10, 2013

(54) ADVERTISING WITH MOBILE MESSAGING

(75) Inventor: Khondokar Sami Mohammad Iqram, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1120 days.

(21) Appl. No.: 12/104,440

(22) Filed: Apr. 17, 2008

(65) Prior Publication Data

US 2009/0264105 A1 Oct. 22, 2009

(51) Int. Cl.
H04M 3/00 (2006.01)
(52) U.S. Cl.
USPC .......... 455/418; 455/414.1; 455/566; 705/1.1
(58) Field of Classification Search
USPC ........ 455/418, 414.1, 412.1, 566; 705/14, 1.1
See application file for complete search history.

(56) References Cited

U.S. PATENT DOCUMENTS

| 6,584,323 | B1 | 6/2003 | Son |
| 7,218,918 | B1 | 5/2007 | Alston |
| 2002/0085027 | A1 | 7/2002 | Kim |
| 2004/0034561 | A1 | 2/2004 | Smith |
| 2004/0054580 | A1 | 3/2004 | Kamei et al. |
| 2004/0203958 | A1 | 10/2004 | Trevathan |
| 2007/0032268 | A1 | 2/2007 | Gotfried |
| 2007/0105536 | A1 | 5/2007 | Tingo |
| 2007/0124201 | A1* | 5/2007 | Hu et al. .......................... 705/14 |
| 2007/0202922 | A1* | 8/2007 | Myllynen et al. ............. 455/566 |
| 2008/0243619 | A1* | 10/2008 | Sharman et al. ................ 705/14 |
| 2009/0006628 | A1* | 1/2009 | Webb et al. .................... 709/227 |

FOREIGN PATENT DOCUMENTS

| HU | WO2004021666 A1 | 3/2004 |
| LU | WO03088690 A1 | 10/2003 |

OTHER PUBLICATIONS

"ELBA Project Summary", pp. 2.
Bulander, et al., "Enabling Personalized and Context Sensitive Mobile Advertising While Guaranteeing Data Protection", Proceedings of the EURO-mGOV 2005, Brighton, UK Mobile Government International LLC, pp. 445-454.
Takkula, et al., "Mobile Advertising in Business-to-Business Communications", to be presented at the 11th Conference on Corporate and Mobile Advertising, Ljubljana, Slovenia, Apr. 21-22, 2006, pp. 1-11.

* cited by examiner

Primary Examiner — Danh Le
(74) Attorney, Agent, or Firm — Wolfe-SBMC

(57) ABSTRACT

In accordance with one or more aspects of the content-based advertising in mobile messaging, a message is received from a first mobile device, the received message targeting a second mobile device. One or more advertisements to associate with the message are identified based at least in part on content in the message. Both the message and the one or more advertisements are sent to the second mobile device. The second mobile device receives both the mobile message and the associated one or more advertisements, and displays both the mobile message and the one or more associated advertisements on the mobile device.

20 Claims, 6 Drawing Sheets

ADVERTISING WITH MOBILE MESSAGING

BACKGROUND

It is becoming increasingly commonplace for people to communicate with one another using the messaging capabilities of their mobile devices. In many situations, people send mobile messages to one another rather than using other communication mechanisms such as email or voice. Currently, this messaging among mobile devices typically involves a user of one mobile device inputting text for a message. The message including that text is then sent to another mobile device where it is displayed to the user of that other mobile device. Accordingly, the user experience with current messaging among mobile devices can be unfulfilling, as little additional functionality is available.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the advertising with mobile messaging, a mobile message is received from a source device, the received mobile message identifying a target device as an intended recipient of the mobile message. One or more advertisements are identified based at least in part on the content of the mobile message. Both the mobile message and the one or more advertisements are sent to the target device.

In accordance with one or more aspects of the advertising with mobile messaging, a mobile device receives both a mobile message having originated with a second mobile device and one or more advertisements associated with the mobile message. These one or more advertisements were identified by an advertising service based at least in part on content of the mobile message. The mobile device displays both the mobile message and the one or more advertisements on the mobile device.

BRIEF DESCRIPTION OF THE DRAWINGS

The same numbers are used throughout the drawings to reference like features.

DETAILED DESCRIPTION

Advertising with mobile messaging is discussed herein. Generally, mobile messages are sent from a source device to a target device via a mobile messaging service. For each mobile message, the mobile messaging service identifies one or more advertisements to be associated with the mobile message. The particular one or more advertisements to be associated with a particular message are based at least in part on the content of that particular message. The one or more advertisements to be associated with a particular message can also be based on a current context of the source device and/or the target device. Additionally, whether advertisements are associated with a message can be a feature that is opted into by a user of the source device and/or a user of the target device, optionally with reduced messaging costs to the source device and/or the target device.

Figure 1:
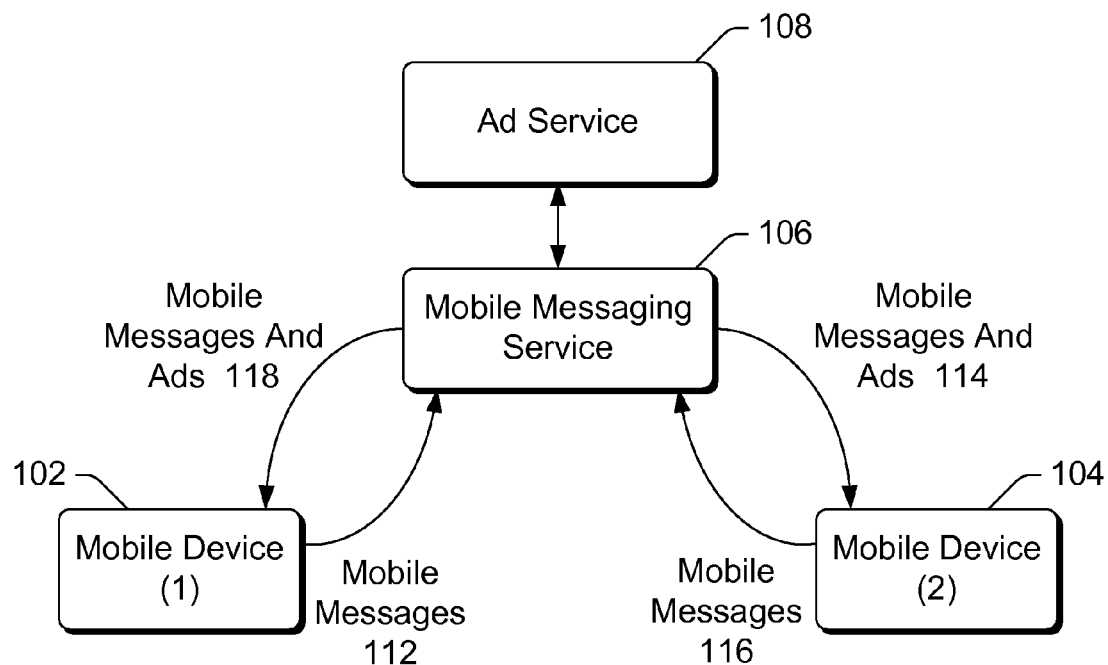
FIG. 1 illustrates an example system implementing the advertising with mobile messaging in accordance with one or more embodiments.

FIG. 1 illustrates an example system 100 implementing the advertising with mobile messaging in accordance with one or more embodiments. System 100 includes mobile devices 102 and 104 that can send mobile messages to one another via a mobile messaging service 106. Additionally, an advertisement (ad) service 108 can be employed by mobile messaging service 106 to obtain ads to be associated with the mobile messages, as discussed in more detail below.

Mobile messages refer to messages that are sent to and/or from a mobile device. Mobile messages are intended to provide real-time communication among users, allowing users to communicate text (and/or other types of content) among each other quickly. Mobile messages differ from email messages in that email messages are more asynchronous in nature—email messages are generally intended to be sent from one user to another and a possible reply received at some future point in time. Email messages can be viewed as an electronic version of traditional handwritten letters sent via the postal service, whereas mobile messages can be viewed as an electronic version of a conversation.

Mobile messaging service 106 is implemented on one or more computing devices, such as one or more server devices. Similarly, ad service 108 is implemented on one or more computing devices (the same devices as service 106 is implemented on, or alternatively different devices), such as one or more server devices. Although illustrated as two separate services, it is to be appreciated that mobile messaging service 106 and ad service 108 can be implemented as a single service.

Mobile devices 102 and 104 can communicate with mobile messaging service 106 in a variety of different manners. In one or more embodiments, mobile devices 102 and 104 communicate with mobile messaging service 106 via a cell (or cellular) phone network, which can be a digital and/or analog network, such as networks based on CDMA (Code Division Multiple Access) technologies, GSM (Global System for Mobile communications) technologies, TDMA (Time Division Multiple Access) technologies, combinations thereof, and so forth. This communication can also occur over one or more other networks, in place of or in addition to a cell phone network, such as a satellite phone network, the Internet, a local area network (LAN), a public telephone network, an intranet, other public and/or proprietary networks, Bluetooth connections, combinations thereof, and so forth.

Mobile messages are messages that are sent from and/or to a mobile device. These messages can include different types of content, such as one or more of text, images, audio, video, combinations thereof, and so forth. These mobile messages can take different forms using different communications protocols, such as the SMS (Short Message Service) communications protocol, the Multimedia Messaging Service (MMS) communications protocol, Enhanced Messaging Service (EMS) communications protocol, combinations thereof, and so forth.

Mobile device 102 and mobile device 104 can each be a variety of different devices capable of sending and/or receiving mobile messages. Mobile device 102 and mobile device 104 can each be the same type of mobile device, or alternatively different types of mobile devices. For example, each of devices 102 and 104 can be a cell phone, a satellite phone, a wireless phone, a game console, an automotive computer, a personal digital assistant (PDA), and so forth.

Figure 2:
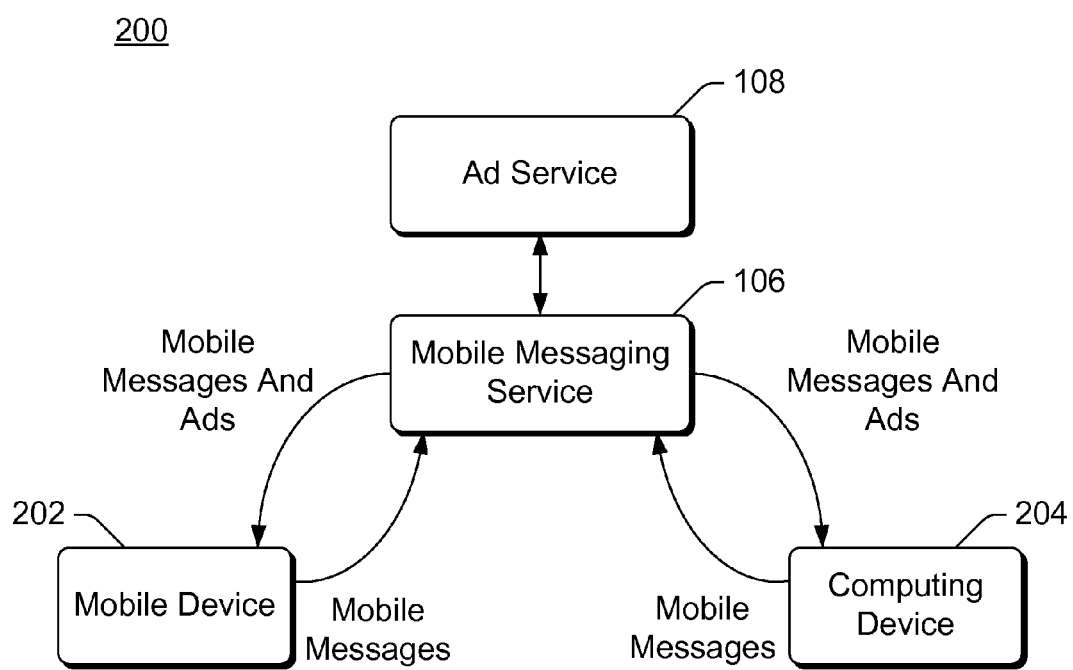
FIG. 2 illustrates another example system implementing the advertising with mobile messaging in accordance with one or more embodiments.

FIG. 1 is discussed with reference to mobile messages being communicated between two mobile devices. FIG. 2 illustrates another example system 200 implementing the advertising with mobile messaging in accordance with one or more embodiments. Although the advertising with mobile messaging is discussed herein primarily with reference to mobile messages being communicated among mobile devices, one of these devices can also be a non-mobile computing device as illustrated in system 200.

System 200 includes a mobile device 202 that can send mobile messages to and/or receive mobile messages from a computing device 204 via a mobile messaging service 106. Additionally, an ad service 108 can be employed by mobile messaging service 106 to obtain ads to be associated with the mobile messages, as discussed in more detail below. Mobile messaging service 106 and ad service 108 operate as discussed with reference to FIG. 1.

Mobile device 202 can be a variety of different types of mobile devices, analogous to the discussion above regarding mobile device 102 of FIG. 1. Computing device 204 can be a variety of different devices capable of receiving and/or sending mobile messages. For example, computing device 204 can be a desktop computer, an entertainment appliance, a set-top box communicatively coupled to a display device, a television, a game console, and so forth. Thus, computing device 204 may range from a full resource device with substantial memory and processor resources (e.g., personal computers, game consoles) to a low-resource device with limited memory and/or processing resources (e.g., traditional set-top boxes, televisions).

System 200 differs from system 100 of FIG. 1 in that mobile messages are communicated to (or from) a non-mobile computing device 204. A non-mobile computing device (such as device 204) differs from a mobile device (such as device 202) in that a non-mobile computing device is designed to be typically not mobile during operation. For example, a desktop computer, a set-top box, a television, and similar devices are typically not designed to be mobile during operation and thus are non-mobile devices (even though they can be physically moved).

Returning to FIG. 1, a mobile message typically originates with a source device and is communicated to a target device. The target device is the target or intended recipient of the mobile message, and is typically identified in the mobile message. The target device can be identified in a variety of different manners, such as by phone number, network address, user id (e.g., an id used by the target device to log into mobile messaging service 106), and so forth.

Mobile device 102 can be a source device for mobile messages 112 with mobile device 104 being the target device of mobile messages 112. Mobile messages 112 are received by messaging service 106 which employs ad service 108 to identify one or more ads to be associated with mobile messages 112. For the mobile messages targeting mobile device 104, messaging service 106 communicates the mobile messages and associated ads 114 to mobile device 104. Similarly, mobile device 104 can be a source device for mobile messages 116 with mobile device 102 being the target device of mobile messages 116. Mobile messages 116 are received by messaging service 106 which employs ad service 108 to identify one or more ads to be associated with mobile messages 116. For the mobile messages targeting mobile device 102, messaging service 106 communicates the mobile messages and associated ads 118 to mobile device 102.

Only two mobile devices 102 and 104 are illustrated in FIG. 1 for ease of explanation. It is to be appreciated, however, that mobile messages can be communicated among multiple devices. For example, a mobile message 112 can target mobile device 104 as well as one or more other mobile devices (not shown). By way of another example, mobile messages from other mobile devices (not shown) can target mobile device 102 and/or mobile device 104. Additionally, mobile messaging service 106 can manage mobile messages between multiple additional mobile devices (not shown).

In one or more embodiments, the associating of ads with mobile messages is a mobile message advertising feature offered by messaging service 106 that can be opted into by a user of mobile device 102 and/or a user of mobile device 104. Each mobile device is typically associated with a single user, so a user opting into the mobile message advertising feature can also be viewed as the mobile device opting into the mobile message advertising feature. Alternatively, different users may be able to log into a particular mobile device, and/or log into messaging service 106 via a mobile device, in which case the opting into the mobile message advertising feature refers to the user of the particular mobile device at a particular time. Accordingly, whether a mobile device has opted into the mobile message advertising feature can change over time based on the particular user logged into that mobile device and/or logged into messaging service 106 using that mobile device.

In embodiments employing this opting-in, messaging service 106 associates ads only with mobile messages received from a source device that has opted into the advertising feature and that are being sent to a target device that has opted into the advertising feature. Alternatively, messaging service 106 associates ads with a mobile message received from a source device that has opted into the advertising feature regardless of whether the target device has opted into the advertising feature. In other alternatives, messaging service 106 associates ads with a mobile message being sent to the target device that has opted into the advertising feature regardless of whether the source device has opted into the advertising feature.

Allowing mobile devices to opt into the advertising feature allows users of the mobile devices to decide whether or not they will receive ads with mobile messages. In one or more embodiments, various compensation can be provided to users of mobile devices that have opted into the advertising feature. This compensation can take a variety of different forms. For example, mobile messages may have an associated cost and this cost can be reduced by the user opting into the advertising feature. By way of another example, a user may purchase the ability to send a particular number of mobile messages for a particular cost, and the number of mobile messages that can be sent for this particular cost can be greater if the user opts into the advertising feature than if the user does not opt into the advertising feature. By way of another example, various rebates can be provided to the user if he or she opts into the advertising feature, such as a cash rebate on his or her monthly cell phone bill, additional minutes to be used for telephone calls with his or her cell phone, and so forth.

During operation, when a mobile message is received by messaging service 106, the content of the message is analyzed and one or more ads to be associated with the received mobile message are identified based on the content of the message.

Although this analysis of the content and identification of one or more ads is discussed herein primarily as being performed by ad service 108, alternatively part or all of this analysis and identification can be performed by mobile messaging service 106. These identified ads are ads that ad service 108 determines have a high likelihood of being relevant to the received mobile message. Multiple such ads can be identified by ad service 108, and particular ones of these multiple ads can be selected by ad service 108 to be associated with the received mobile message.

An ad refers to a description of, or information regarding, a product, service, provider, and so forth. Ads can take different forms such as text, images, audio, video, combinations thereof, and so forth. In one or more embodiments, different mobile devices can support different types of ads. For example, mobile device 102 may support, and thus be able to playback, text, image, audio, and video ads, whereas mobile device 104 may support, and thus be able to playback, only text ads. The individual mobile devices register with mobile messaging service 106, or otherwise make available to mobile messaging service 106, information identifying the particular types of ads that the individual mobile devices support.

Figure 3:
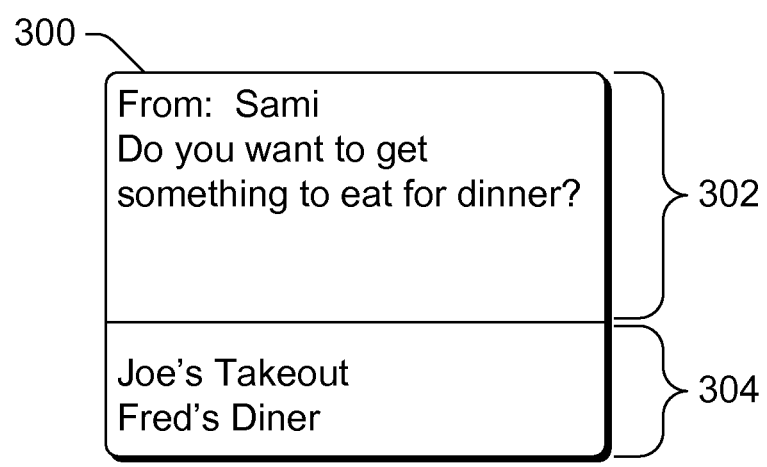
FIG. 3 illustrates an example display of mobile message content and associated ads in accordance with one or more embodiments.

FIG. 3 illustrates an example display 300 of mobile message content and associated ads in accordance with one or more embodiments. In the example display 300, a content portion 302 includes the mobile message content, which identifies "Sami" as the sender of the mobile message and text of "Do you want to get something to eat for dinner?" An advertisement portion 304 includes two ads: one for "Joe's Takeout" and another for "Fred's Diner".

It is to be appreciated that display 300 is only an example, and a variety of different displays can alternatively be used. For example, the content of the mobile message can be different types, as discussed above. By way of another example, the ads are displayed in portion 304 of display 300 as text, although they can alternatively be other types of content, can include links or other options for interacting with the ad as discussed in more detail below, and so forth.

Returning to FIG. 1, based on its analysis of a received mobile message, ad service 108 identifies one or more ads to be associated with the received mobile message. This identification can be performed in a variety of different manners, employing public and/or proprietary techniques. In one or more embodiments ad service 108 employs different rules or algorithms to identify one or more keywords from the content of the received mobile message. Ad service 108 maintains, or has access to, a mapping of ads to keywords and uses this mapping to identify one or more ads based on the identified one or more keywords.

Additionally, ad service 108 can maintain, or access, a record of popular search terms and/or popular Web pages. These Web pages refer to pages of data available on the World Wide Web that are accessible in a variety of different manners, such as using HTML (HyperText Markup Language) requests. Information regarding such popular or frequently accessed Web pages or search terms can be obtained from different sources, such as Internet access providers, search engines, and so forth. This record is updated over time to reflect current popularity of search terms and/or Web pages. These popular search terms and/or Web pages can be used by ad service 108 in identifying the one or more ads. For example, ad service 108 may have different ads for different kinds of pizza, and when a particular keyword of "pizza" is identified, popular search terms and/or Web pages including "pizza" can be identified to determine which different kinds of pizza are most popularly searched for or accessed on the Internet. Ads can then be identified for the kinds of pizza most popularly searched for or accessed on the Internet.

In one or more embodiments, the various ads identified by ad service 108 are assigned an importance or relevancy rating. This importance or relevancy rating can be assigned in different manners, such as based on the popular search terms and/or popular Web pages as discussed above. For example, more popular search terms can be assigned importance or relevancy ratings higher than less popular search terms. By way of another example, terms included in more popular Web pages (e.g., in a title of the Web page, in a uniform resource locator (URL) of the Web page, in the content of the Web page, and so forth) can be assigned importance or relevancy ratings higher than terms included in less popular Web pages.

Those ads having an importance or relevancy rating exceeding a threshold value are identified as the ads to be associated with the received mobile message. If a large number of ads exceed the threshold value, then only those having the highest importance or relevancy ratings can be selected so that not greater than a threshold number of ads are associated with the received mobile message. In one or more other embodiments, a threshold number of desired ads is used and the threshold number of ads having the highest importance or relevancy rating are selected to be associated with the received mobile message. This threshold number of ads can be one, two, three, or more, and is typically set so that the display (or other presentation) of the one or more ads at the target device is not overly intrusive.

Furthermore, mobile messaging service 106 can optionally maintain user preferences associated with a particular mobile device. These user preferences can be set in different manners, such as by a user of the mobile device inputting or otherwise selecting the user preferences, the Web browsing behavior of the mobile device being tracked and the user preferences automatically selected based on this behavior, and so forth. These user preferences can then be made available to ad service 108 and used in identifying the one or more ads. For example, a particular mobile device may have a user preference set for two different restaurants, so when a keyword of "restaurant" is identified in the content of a mobile message, ads for these two different restaurants can be identified. Alternatively, other components or devices can maintain these user preferences, such as the mobile device, ad service 108, or some other device.

It is to be appreciated that a variety of different techniques can also be employed by ad service 108 in identifying one or more ads to be associated with the received mobile message. Particular ads can be identified over other ads based on random selection, based on payments received from advertisers, based on other contract terms or agreements with advertisers, based on user feedback regarding ads users preferred, and so forth.

As an example, assume the content of a particular mobile message includes a keyword "movie". In response to identifying this keyword, ad service 108 can identify one or more ads for current movies and/or movie theaters. By way of another example, the content of a particular mobile message may include a keyword "restaurant". In response to identifying this keyword, ad service 108 can identify one or more ads for restaurants. By way of yet another example, the content of a particular mobile message may include keywords that are the title of the book. In response to identifying these keywords, ad service 108 can identify one or more ads for bookstores (and optionally check for bookstores that have that particular book in stock and identify only ads for those bookstores having a particular book in stock).

Additionally, in one or more embodiments the content (or alternatively keywords) of mobile messages sent by a particular device can be maintained and analyzed over time. This maintaining of the content can optionally be an opt-in feature, so that the content is maintained only if requested by the user. If multiple users use the same device, then the content of the different users (e.g., based on a user id they use to log into mobile messaging service 106) can optionally be maintained separately.

Maintaining the content or keywords from multiple messages for a particular user or mobile device allows ad service 108 to perform data mining across the content of multiple messages and thus identify ads based on the content of the multiple messages. For example, if messages from a particular user or mobile device frequently reference a name of a particular restaurant, then an ad for that particular restaurant can be identified and associated with a mobile message having content including a keyword of "restaurant" even though the specific name of that particular restaurant is not included in the mobile message.

In addition to (or alternatively in place of) the content-based identification of ads discussed above, in one or more embodiments the identification of ads is based on a context of the source device and/or the target device. The context of a particular mobile device typically refers to a geographic location of the mobile device, although can alternatively refer to other physical location information regarding the mobile device, the current time of day, the current day of the week, and so forth. The geographic location of the mobile device can be identified in different manners such as based on the phone number (e.g., the area code) of the mobile device, GPS (Global Positioning System) coordinates from a GPS component or module of or coupled to the mobile device, a cell site or transmitter that the mobile device is communicating with, and so forth.

Information describing this context can be used in different manners. In one or more embodiments, the context information is used to select ads for services or providers that are in close geographic proximity to one or both of the source and target device. For example, ad service 108 may have ads for numerous restaurants throughout a particular city or state, and can use the context information to identify the ads for restaurants that are closest geographically to one or both of the source and target device.

In one or more other embodiments, the context information is used to select ads for services or providers based on a time of the day. For example, ad service 108 may have ads for numerous restaurants that include the hours of operation of those restaurants. Ad service 108 can use the context information to identify one or more ads for restaurants that are open at the time that the mobile message is sent.

The context information can be based on the context of the source device and/or the target device. In one or more embodiments, context information for the source device is used. For example, if the content of a particular mobile message includes a keyword "movie", ad service 108 can identify one or more ads for movie theaters in close geographic proximity to the source device. In one or more other embodiments, context information for the target device is used. For example, if the content of a particular message includes a keyword "movie", ad service 108 can identify one or more ads for movie theaters in close geographic proximity to the target device. In one or more other embodiments, context information for both source and target devices is used. For example, if the content of a particular message includes a keyword "movie", ad service 108 can identify one or more ads for movie theaters in close geographic proximity to a midpoint between the source and target devices.

Additionally, in one or more embodiments the source device can communicate with ad service 108 and perform data mining on ads from ad service 108. This allows the source device itself to obtain ads associated with a message rather than (or in addition to) having mobile messaging service 106 obtain the ads when the message is received from the source device. For example, the source device can request ads from ad service 108 before sending the mobile message.

By way of another example, the source device (or another component, such as ad service 108 and/or mobile messaging service 106) can maintain a record of ads, such as ads previously selected by the user, keywords previously entered by the user, and so forth. This record can then be used to identity an ad for a current message being sent by the user. As a specific example, assume that the user has previously selected a particular restaurant for one or more previous messages he or she has sent out. The next time the user is typing a similar message (e.g., based on keywords in the messages), the source device can suggest this particular restaurant and associate an ad for this particular restaurant with the message (analogous to the association performed by mobile messaging service 106 discussed above).

Furthermore, in one or more embodiments the source device can download a set of suggested ads from mobile messaging service 106 and/or ad service 108. This set of ads can be based on past user behavior (e.g., messages previously sent, ads previously tagged by the user (as discussed in more detail below), etc.), based on user preferences previously identified by the user, based on the desires of service 106 and/or 108, and so forth. This set of ads can be the record of ads maintained by the source device and used for suggesting ads to the user of the source as discussed above.

As discussed above, mobile messaging service 106 sends the mobile message and one or more associated ads to the target device. The mobile message as well as the one or more associated ads are displayed or otherwise presented to the user of the target device. In one or more embodiments, the mobile message is displayed or otherwise presented concurrently with the one or more associated ads. The one or more associated ads can be displayed in a separate portion of a display or screen of the mobile device, or alternatively can be included as part of (e.g., embedded in), and displayed as part of, the associated mobile message.

A variety of different actions can be taken at the target device in response to a received ad. As discussed in more detail below, these different actions can be based on the content of the ad itself, the capabilities of the target device, and/or the desires of the user of the target device.

In one or more embodiments, an ad is descriptive rather than being interactive. A descriptive ad can include text and/or other types of content based on, for example, the capabilities of the target mobile device. For example, if the content of a particular message include keywords that are the title of a book, the ad displayed at the target mobile device can be a descriptive ad that identifies one or more bookstores that are in close geographic proximity to the target mobile device at the time the particular message and associated ad are received.

In one or more other embodiments, an ad is interactive. An interactive ad can include descriptive information as well as allow one or more user interactions with the ad. A variety of different user interactions can be supported based on the desires of the creator of the ad as well as the capabilities of the target mobile device.

In one or more embodiments, the ad corresponds to one or more Web pages. The ad can be a link, or can include a link, to the corresponding one or more Web pages. A user of the target device can select the link in a variety of different manners, such as using a stylus, a finger, a verbal command, a cursor, and so forth. In response to selection of the link, the corresponding Web page is browsed to (e.g., loaded and displayed) on the target mobile device. The ad can optionally include multiple links, such as a link to a Web page with additional description of the product or service in the ad, a link to a product or service review Web page, a link to a mapping Web page that shows a location of a particular business on a map, and so forth.

In one or more other embodiments, a user can select to save the ad to a social networking site to which the user belongs. The selection can be made in a variety of different manners, such as by selection of a "save" option displayed as part of the ad, selection of an option from a pulldown menu, inputting of a verbal command, and so forth. In response to the selection, the ad is saved to a social networking site identified by the user. The social networking site can be identified by the user when the selection to save the ad to the social networking site is made, or alternatively at other times (e.g., the user can have previously set a user preference for a particular social network site, may have already logged into a social network site with the mobile device, etc.).

In one or more other embodiments, a user can select to email a link to the ad, or a link to a corresponding ad, to one or more other users. The selection can be made in a variety of different manners, such as by selection of an "email" option displayed as part of the ad, selection of an option from a pulldown menu, inputting of a verbal command, and so forth. As part of the selection, an identification of the link to be emailed is identified to an email application (e.g., running on the target mobile device), which in turn emails the link to one or more email recipients identified by the user.

In one or more other embodiments, a user can select to directly place a reservation or order for an advertised product or service. The selection can be made in a variety of different manners, such as by selection of an "order" option displayed as part of the ad, selection of an option from a pulldown menu, inputting of a verbal command, and so forth. Selection to directly place a reservation or order can also optionally involve navigating to one or more Web pages corresponding to the ad via which the reservation or order can be placed. For example, a user could select an order option for an advertisement for a bookstore, in response to which a Web page for the bookstore can be displayed allowing the user to order a desired book.

Additionally, in one or more embodiments the user is able to select or tag a particular ad for use in a response message. This selecting or tagging a particular ad can be made in a variety of different manners, such as by selection of a "tag" option displayed as part of the ad, selection of an option from a pulldown menu, inputting of a verbal command, and so forth. The entire ad can be tagged for use in the response message, or alternatively only a portion of the ad can be tagged. Whether all or only selected portions of the ad are tagged can be identified by the ad itself, or alternatively by the user. In one or more embodiments this selecting or tagging of a particular ad is functionality provided by an application running on the target device, allowing both descriptive ads and interactive ads to be selected or tagged. Alternatively, this selecting or tagging of a particular ad can be functionality provided by the ad itself.

When the user of the target device desires to send a response message to the mobile message that the target device received, the tagged information from the ad is included in the response message. Additional message content can also optionally be added to the response message by the user. By way of example, an ad for a restaurant may include a name of the restaurant, a description of the restaurant, an address of the restaurant, and a phone number of the restaurant. The user can tag the ad so that all of this information, or alternatively portions of this information (e.g., name, address, and phone number), are included in the return message.

In one or more embodiments, messaging service 106 identifies such response messages and can optionally choose to not associate one or more ads with the response message when sending the response message to the target device of the response message. This identification can be performed in different manners, such as by tracking messages sent between mobile devices, based on an indication included in the response message that the response message includes tagged information, and so forth. Alternatively, no such identification may be made, and mobile messaging service 106 does not distinguish between mobile messages that are response messages and those that are not.

It should be noted that the response message typically includes, as a target device, the device that was the source device of the mobile message being responded to. In one or more embodiments, the response message can also have one or more additional target devices. As the response message is a mobile message, one or more ads can be associated with the response message as sent to each of these additional target devices as discussed above.

Furthermore, upon receipt of the response message, the target device of the response message can forward the response message to one or more other target devices. And, as the response message is a mobile message, one or more ads can be associated with the response message as sent to each of these additional target devices as discussed above.

It should also be noted that in both FIGS. 1 and 2 the systems are shown as having the mobile messaging service 106 receive mobile messages from a source device and transmit the mobile messages to the target device. Alternatively, messages can pass through the advertising service. For example, ad service 108 can receive a mobile message from the source device, associate one or more ads with the mobile message, then forward both the mobile message and the associated one or more ads to mobile messaging service 106, which in turn forwards the mobile message to the target device. By way of another example, mobile messaging service 106 can receive a mobile message from the source device and forward the mobile message to ad service 108, which in turn associates one or more ads with the mobile message and then forwards both the mobile message and the one or more ads to the target device.

Additionally, it should further be noted that although the mobile messages and associated ads are illustrated in FIGS. 1 and 2 as being sent to the target together, the mobile message and its associated one or more ads can alternatively be sent separately. The mobile message and associated one or more ads can be sent by the same service (e.g., mobile messaging service 106) or alternatively different services (e.g., the mobile message being sent by mobile messaging service 106 and the ad being sent by ad service 108). When sent separately, the mobile message can include one or more identifiers of the one or more ads, and/or the one or more ads can include an identifier of the mobile message, so that the association between the mobile message and the one or more ads can be identified at the target device. The identification of this association at the target device allows the one or more ads associated with a mobile message to be displayed or otherwise presented concurrently with the associated mobile message even in situations where the message and one or more ads were sent to the target device separately.

In addition, it should also be noted that although the discussions herein primarily refer to one or more ads being associated with a mobile message, the display or other presentation of the one or more ads need not be concurrent with the display or other presentation of the mobile message. For example, one or more ads can be identified based on the content of the mobile message and/or context information as discussed above, and these ads displayed to a user of the mobile device at a different time (e.g., before or after) than the mobile message itself is displayed to the user.

Figure 4:
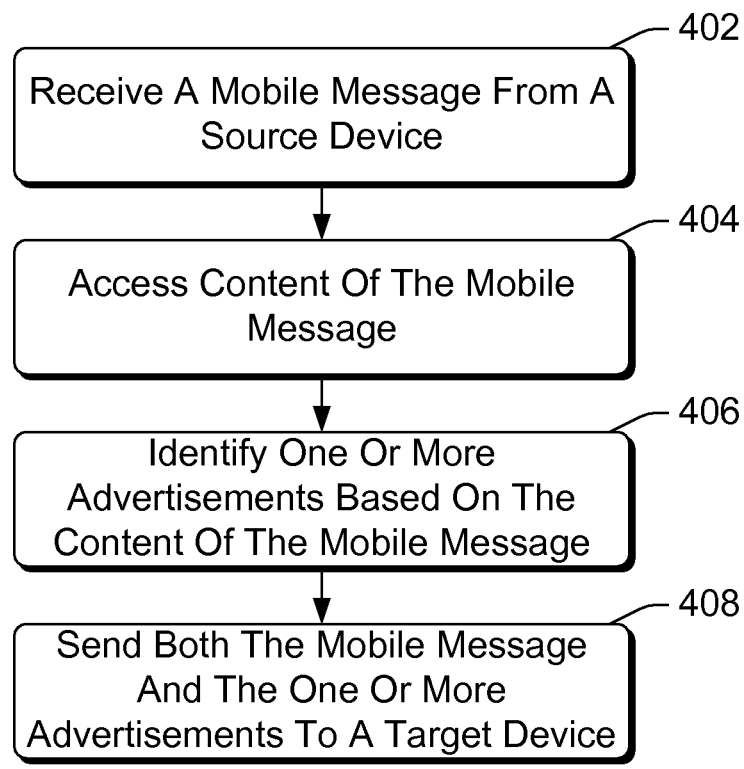
FIG. 4 is a flowchart illustrating an example process for advertising with mobile messaging.

FIG. 4 is a flowchart illustrating an example process 400 for advertising with mobile messaging. Process 400 is carried out by one or more services, such as services 106 and 108 of FIG. 1, and can be implemented on one or more devices in software, firmware, hardware, or combinations thereof. Process 400 is an example process for advertising with mobile messaging; additional discussions of advertising with mobile messaging are included herein with reference to different figures.

Initially, a mobile message is received from a source device (act 402), and the content of the received mobile message is accessed (act 404). This mobile message can have a variety of different forms and include a variety of different types of content as discussed above.

One or more advertisements based on the content of the received mobile message are identified (act 406). The one or more advertisements identified in act 406 are associated with the received mobile message, and both the mobile message and the associated advertisements are sent to a target device (act 408). This target device is the device identified in the mobile message received in act 402 as the target of the mobile message.

Figure 5:
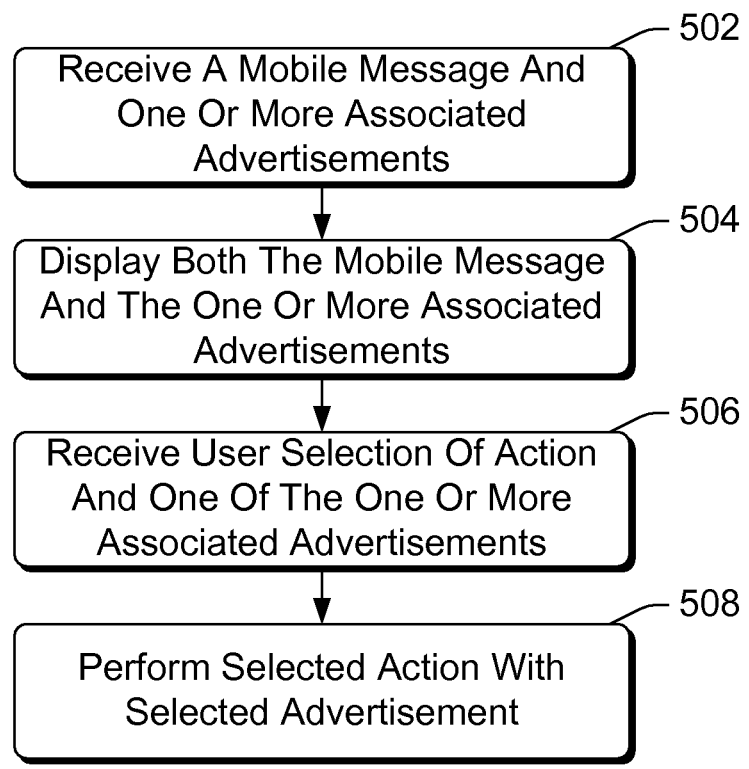
FIG. 5 is a flowchart illustrating an example process for advertising with mobile messaging.

FIG. 5 is a flowchart illustrating an example process 500 for advertising with mobile messaging. Process 500 is carried out by a target device, such as device 102 or 104 of FIG. 1, or device 202 or 204 of FIG. 2, and can be implemented in software, firmware, hardware, or combinations thereof. Process 500 is an example process for advertising with mobile messaging; additional discussions of advertising with mobile messaging are included herein with reference to different figures.

Initially, a mobile message and one or more associated ads are received (act 502). Both the received mobile message and the one or more associated ads are displayed or otherwise presented (act 504).

However, a user selection of an action and one of the one or more associated ads can then be received (act 506), and the selected action performed with the selected ad (act 508). The action can be a variety of different actions as discussed above, such as loading a Web page, saving the ad to a social networking site, emailing a link to the ad, placing an order for an advertised product or service, tagging an ad for use in a response message, and so forth. Additionally, in situations where multiple interactive ads are displayed concurrently, a selection of one of the associated ads is received in act 506. The selection can be explicit, such as a user selecting an identifier of one of the multiple ads, or alternatively implicit, such as a user selecting a link for a particular action on a particular one of the multiple ads.

The advertising with mobile messaging allows for numerous different usage scenarios. By way of example, a user at a source device could create a mobile message intended for a friend, the mobile message including the text "Let's watch a movie in the theater". One or more ads of movie theaters in close geographic proximity to the user's device (the source device) and/or the friend's device (the target device) can be associated with the message. Both the message and the one or more ads are then communicated to and displayed at the friend's device.

By way of another example, a user at a source device could create a mobile message intended for a friend, the mobile message including the text "Do you want to go get something to eat for dinner?" One or more ads of restaurants in close proximity to the user's device (the source device) and/or the friend's device (the target device) can be associated with the message. Both the message and the one or more ads are then communicated to and displayed at the friend's device. At the target device, the friend views the mobile message and the one or more ads. The friend creates a response message including the text "Yes let's meet at" and also tags one of the ads displayed on his or her device. The response mobile message is then sent to the user (which using the target device of the response message), the response message being displayed to the user as including the text "Yes let's meet at" as well as the address of the restaurant in the tagged ad. The user can also optionally forward this response message, including the address of the restaurant in the tagged ad to one or more other friends.

Figure 6:
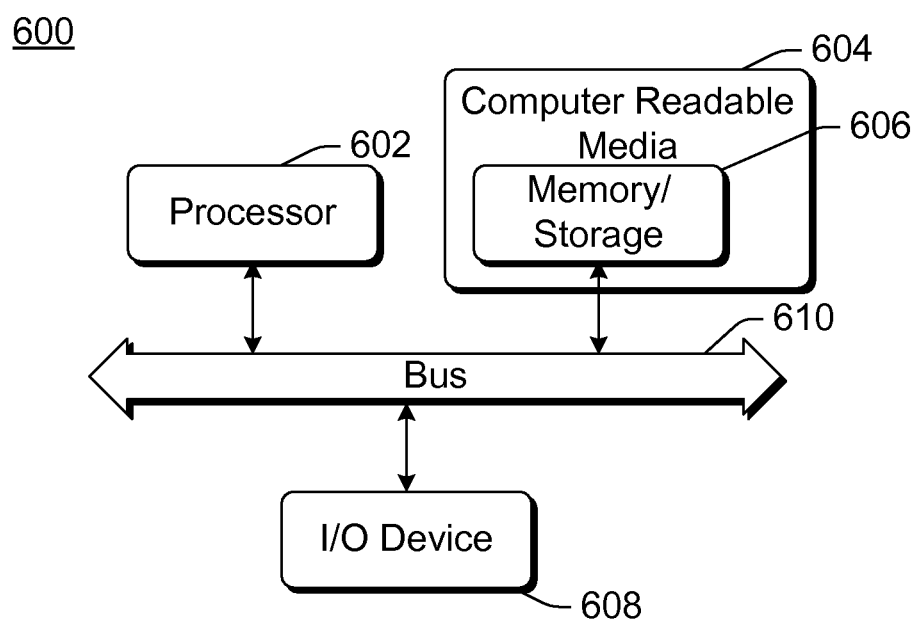
FIG. 6 illustrates an example computing device that can be configured to implement the advertising with mobile messaging in accordance with one or more embodiments.

FIG. 6 illustrates an example computing device 600 that can be configured to implement the advertising with mobile messaging in accordance with one or more embodiments. Computing device 600 can be, for example, a mobile device 102 or 104 of FIG. 1, a mobile device 202 or computing device 204 of FIG. 2, can implement a mobile messaging service3 106 and/or ad service 108 of FIG. 1 or 2, and so forth.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "functionality," and "logic" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 6. The features of the advertising with mobile messaging techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a mobile message from a source device, the mobile message identifying a target device as an intended recipient of the mobile message;
   determining whether at least one of the source device or the target device has opted into a mobile message advertising feature, wherein a mobile device that has opted into the mobile message advertising feature enables advertisements to be identified for association with mobile messages sent to and mobile messages received from the mobile device that has opted into the mobile message advertising feature;
   identifying, based at least in part on content of the mobile message and in part on whether at least one of the source device or the target device has opted into the mobile message advertising feature, one or more advertisements configured for display on the target device with the mobile message; and
   sending both the mobile message and the one or more advertisements configured for display to the target device, wherein the sending is performed by sending the mobile message and the one or more advertisements configured for display separately.

2. A method as recited in claim 1, the source device comprising a first cell phone and the target device comprising a second cell phone.

3. A method as recited in claim 1, further comprising accessing an ad service to identify the one or more advertisements.

4. A method as recited in claim 1, the identifying comprising identifying the one or more advertisements based at least in part on a context of the source device.

5. A method as recited in claim 1, the identifying comprising identifying the one or more advertisements based at least in part on a context of the target device.

6. A method as recited in claim 1, the identifying comprising identifying the one or more advertisements based at least in part on a context of the source device and a context of the target device.

7. A method as recited in claim 1, further comprising performing the identifying only if a user of the target device has opted into the mobile message advertising feature.

8. A method as recited in claim 7, further comprising providing compensation to the user of the target device if the user of the target device has opted into the mobile message advertising feature.

9. One or more computer storage media having stored thereon multiple instructions that, when executed by one or more processors of one or more devices, cause the one or more processors to perform operations comprising:
   receiving a mobile message from a first mobile device, the mobile message targeting a second mobile device;
   determining whether at least one of the first mobile device or the second mobile device has opted into a mobile message advertising feature, wherein a mobile device that has opted into the mobile message advertising feature enables advertisements to be identified for association with mobile messages sent to and mobile messages received from the mobile device that has opted into the mobile message advertising feature;
   accessing content of the mobile message responsive to a determination that at least one of the first mobile device or the second mobile device has opted into the mobile message advertising feature;
   identifying, one or more advertisements to associate with the mobile message, wherein the identification is based at least in part on content of the mobile message, a context of the first mobile device, and a context of the second mobile device; and
   sending both the mobile message and the one or more advertisements to the second mobile device.

10. One or more computer storage media as recited in claim 9, the first mobile device comprising a first cell phone and the second mobile device comprising a second cell phone.

11. One or more computer storage media as recited in claim 9, the operations further comprising accessing an ad service to identify the one or more advertisements.

12. One or more computer storage media as recited in claim 9, the accessing and the identifying being performed only if a user of the first mobile device has opted into the mobile message advertising feature.

13. One or more computer storage media as recited in claim 12, the user of the first mobile device having opted into the mobile message advertising feature in exchange for compensation.

14. A mobile messaging service comprising:
one or more processors of one or more devices; and
computer storage media having stored thereon multiple instructions that, when executed by the one or more processors, cause the one or more processors to perform operations comprising:
receiving a mobile message from a first mobile device, the mobile message targeting a second mobile device;
determining whether at least one of the first mobile device or the second mobile device has opted into a mobile message advertising feature, wherein a mobile device that has opted into the mobile message advertising feature enables advertisements to be identified for association with mobile messages sent to and mobile messages received from the mobile device that has opted into the mobile message advertising feature;
accessing content of the mobile message responsive to a determination that at least one of the first mobile device or the second mobile device has opted into the mobile message advertising feature;
identifying one or more advertisements to associate with the mobile message, wherein the identification is based at least in part on content of the mobile message, a context of the first mobile device, and a context of the second mobile device; and
sending both the mobile message and the one or more advertisements to the second mobile device.

15. A mobile messaging service as recited in claim 14, the first mobile device comprising a first cell phone and the second mobile device comprising a second cell phone.

16. A mobile messaging service as recited in claim 14, the operations further comprising accessing an ad service to identify the one or more advertisements.

17. A mobile messaging service as recited in claim 14, the accessing and the identifying being performed only if a user of the first mobile device has opted into the mobile message advertising feature.

18. A mobile messaging service as recited in claim 17, the user of the first mobile device having opted into the mobile message advertising feature in exchange for compensation.

19. A mobile messaging service as recited in claim 18, the operations further comprising providing the compensation to the user of the first mobile device.

20. A mobile messaging service as recited in claim 14, the user of the second mobile device having opted into the mobile message advertising feature in exchange for compensation, and the operations further comprising providing the compensation to the user of the second mobile device.

* * * * *